J. M. HAMILTON.
SHOCK ABSORBING ANTIFRICTION SPRING.
APPLICATION FILED DEC. 11, 1916, RENEWED MAY 7, 1918.

1,268,966.

Patented June 11, 1918.

Inventor
John M. Hamilton,
by
his Attorney.

UNITED STATES PATENT OFFICE.

JOHN M. HAMILTON, OF LOS ANGELES, CALIFORNIA.

SHOCK-ABSORBING ANTIFRICTION-SPRING.

1,268,966.  Specification of Letters Patent.  Patented June 11, 1918.

Application filed December 11, 1916, Serial No. 136,133. Renewed May 7, 1918. Serial No. 233,170.

*To all whom it may concern:*

Be it known that I, JOHN M. HAMILTON, a citizen of the United States, residing at Los Angeles, in the county of Los Angeles, State of California, have invented new and useful Improvements in Shock-Absorbing Antifriction-Springs, of which the following is a specification.

This invention relates to improvements in vehicle springs such as are used on automobiles and the like; and the present improvement has for its object the provision of a spring equipped with shock absorbing mechanism and also, preferably in combination with the shock absorbing mechanism, equipped with anti-friction devices.

It is an object of this invention to provide a shock absorber which shall be contained in, and be an integral part of, the spring itself; one which may be built with the spring as an integral part thereof, and which consequently, does not need to be attached to the spring as an attachment or exterior auxiliary. It is also an object of this invention to provide certain improvements in anti-friction devices for springs.

Figure 1:
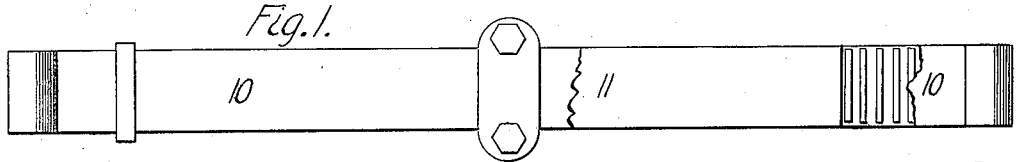
Figure 2:
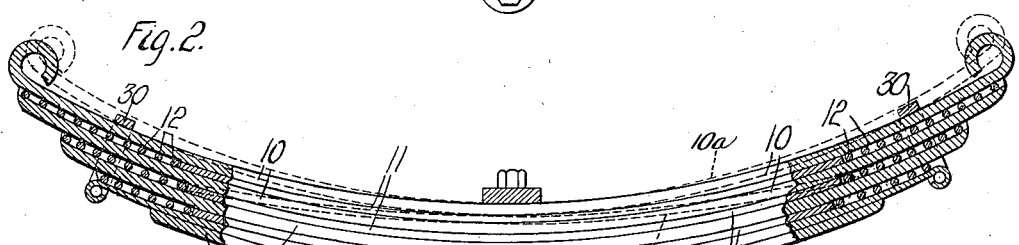
Figure 3:
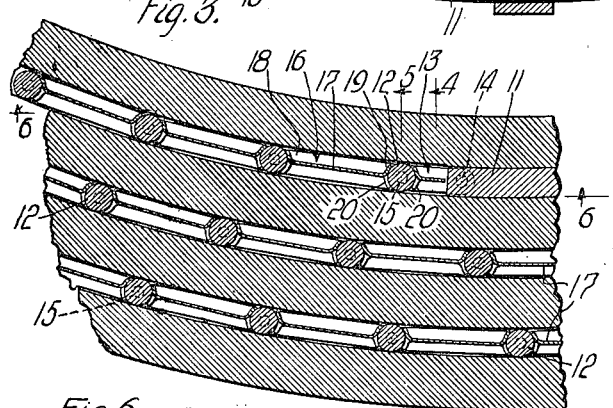
Figure 4:
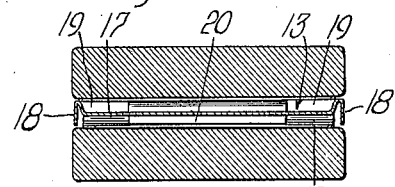
Figure 5:
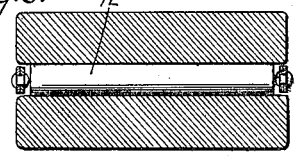
Figure 6:
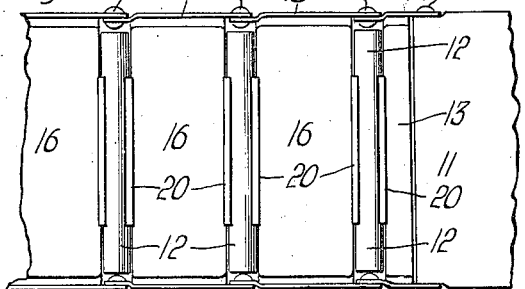
Figure 8:
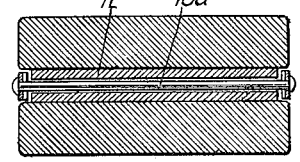
Figure 7:
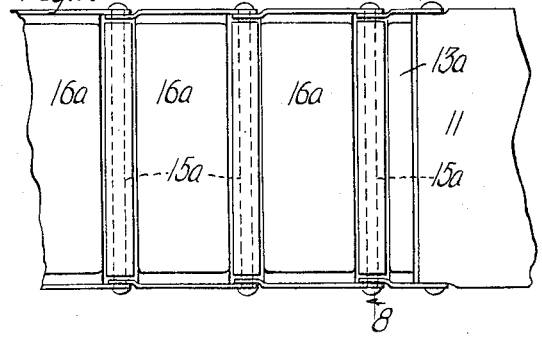

These objects, and other objects of my invention, will be understood from the following detailed specification of preferred forms of my device, reference being had to the accompanying drawings in which: Figure 1 is a plan of my improved spring, parts being broken away for purposes of illustration; Fig. 2 is a longitudinal section of the spring; Fig. 3 is an enlargement of a portion of Fig. 2; Fig. 4 is a section taken as indicated by line 4 of Fig. 3; Fig. 5 is a section taken as indicated by line 5 on Fig. 3; Fig. 6 is a view taken as indicated by line 6—6 on Fig. 3; Fig. 7 is a similar view showing a modification, and Fig. 8 is a section taken as indicated by line 8—8 on Fig. 7.

In the drawings I have shown a spring including the usual spring leaves 10 between which I place the spring members 11. These spring members 11 are preferably shorter than the leaves and extend throughout the middle portions only of the leaves, although the extent of these spring members is not a feature to which I limit myself. The nature and action of these spring members will be hereinafter fully described; their action including not only that of shock absorbing, but also, in the frictionless combination, that of acting as spacers for the spring leaves.

The spring leaves being spaced apart, as illustrated, I place between their outer portions the rollers 12. These rollers are spaced from each other and extend from the outer ends of the spring members 11 to approximately the outer ends of the spring leaves. These rollers act to relieve the usual frictional contact between the relatively moving surfaces of the outer parts of the spring leaves. It will be understood that the inner or central parts of the spring leaves have comparatively little relative sliding motion, while the outer parts of the spring leaves have so much sliding motion that usually the friction between them damps off the proper resilient action of the vehicle spring.

In Figs. 3, 4, 5 and 6 I show one method of mounting and spacing the rollers 12. I attach a spacer frame 13 to the end of the spring member 11, the attachment being by pivotal connection at 14 as illustrated. This spacer frame 13 is pivotally connected at 15 to the next spacer frame 16; and then I provide further spacer frames 16 which extend out to the ends of the spring leaves, these frames being similarly pivotally interconnected at the points 15. The spacer frames are all made alike; and the only difference between the frames 13 and the frames 16 is that the frames 13 may be shorter than the frames 16; but this is not necessarily the case. Each of these frames has a central web 17 and side flanges 18; the whole being pressed out of one piece of sheet metal. The rollers 12 lie concentrically on the pivotal points 15 and each spacer frame has at each end the upwardly projecting roller engaging lips 19 and similar downwardly projecting lips 20. These lips are bent so as to form cages for the rollers, allowing the rollers to move rotatively without friction. It will be noted that the frames, being pivotally interconnected at the axes of the rollers, move with the spring leaves and do not interfere with the proper operation of the rollers.

In Figs. 7 and 8 I have shown a modified form of roller holding means. Here the rivet or pin 15ᵃ which forms the pivotal connection between adjacent spacer frames (13ᵃ and 16ᵃ, etc.) is carried through from side to side and passes through the roller 12, which is made hollow for this purpose, the rollers fitting more or less loosely around the pin 15ª, and fitting fairly loosely between the opposite edges of adjacent spacer frames.

I have explained in my application S. N. 94,537, filed May 1, 1916, an anti-friction spring of somewhat the same general nature as herein described; and in said application I have stated that the members 11 might be auxiliary spring members. In my co-pending application, S. N. 165,337, filed April 30th, 1917, I set forth and claim the anti-friction devices herein shown; and in this present application I direct the claims to certain peculiar features of the auxiliary spring members; and also, generally, to the combination of antifriction devices with auxiliary spring members. I preferably make and arrange these spring members so as to act as shock absorbers; that is, so as to prevent upward rebound of the vehicle due to the rebounding action of the spring. These spring members 11 are preferably made of the same spring steel as that of the spring leaves 10, and, as a typical case, are about one half as thick. The aggregate strength of the auxiliary spring members may be, and in the present case is preferably, less than that of the leaves; preferably the number of auxiliary members is less than that of the leaves, and preferably the individual strength of the members is less than that of a leaf. And the auxiliary spring members are placed between those leaves that are tied together by the clips 30, so that all the auxiliary members exert downward force effective on the uppermost leaf, to which the vehicle body is connected for suspension. The spring leaves are shaped to such a normal curved configuration as illustrated; but the auxiliary spring members 11 are preferably straight, or substantially so; or, as compared with the curvature of the spring leaves, these auxiliary spring members have less curvature, or may be even curved somewhat oppositely to the curvature of the spring leaves. The initial unstressed curvature of the auxiliary members depends upon the nature of the spring, and depends upon the shape of the spring when normally weighted; preferably being of such shape as either to substantially conform to the weighted shape of the spring or so curved as to exert a slight downward pull on the spring when weighted. As a result, these auxiliary spring members have (when the spring is unstressed by a load in the position shown in the drawings in Fig. 2) a downward pulling effect upon the spring leaves, and have an effect to retard the upward rebound action of the spring leaves. The spring members 11 are under a normal, initial tension, due to being flexed to the normal curvature of the spring leaves. I find, in a typical case, that when the spring leaves are one-quarter inch thick, if I make the auxiliary spring members normally straight, of one-eighth inch thickness, and put in three of them in spaces between the leaves, then the rebound absorbing action is very noticeable. And this action takes place without interference with the free resilient downward action of the spring. However, the auxiliary members may be even as strong or stronger than the spring leaves, as the action of the members depends not entirely upon their relative strength but very greatly depends upon their normal unstrained curvature. In Fig 2 I show the normal position of the assembled spring, unstressed by a load; and in dotted lines at 10ª and 11ª I show typical initial entirely unstressed shapes of a spring leaf 10 and a spring member 11. Now, when a load is put on the spring all the superimposed spring leaves and members are moved down, to a lesser curvature than shown in Fig. 2, to a curvature approximately corresponding to the curvature shown in dotted lines at 11ª; so that, as herein stated, when the spring is normally weighted, the spring members 11 are in substantially unstressed condition. Or, when the spring is normally weighted, it may not be brought down to the curvature shown at 11ª; and the members 11 will then be normally slightly stressed upwardly so that they still exert some downward pull on the spring leaves.

It will be seen that the action of the auxiliary spring members does not pull the spring leaves down to any great or appreciable extent; because ordinarily, when the weight of the vehicle is on the spring, the leaves are moved downwardly almost to a straight position; so that, under ordinary circumstances, the auxiliary spring members are not called into action. Or, if they are in action, they are acting somewhat to pull the spring down (to straighten it out) rather than to move it up (make it more curved). However, when the spring has a tendency to move up (to become more concave, or more sharply curved) then the auxiliary spring members are immediately called into action; and by the time the spring leaves reach their normal unweighted position of curvature, the auxiliary spring members are pulling down on the spring leaves with a force sufficient to very greatly decrease the rebound. That is, the force exerted by the auxiliary members to stop a rebound is always increasing as the spring moves up, and even before the spring leaves have moved to the point where, by being concaved beyond their normal unweighted curvature, they begin to oppose the upward movement. It will thus be seen that my spring is made up of parts (leaves and auxiliary members) one of which is practically in normal unstrained or almost unstrained state when the other is under the usual load stress. Any downward movement due to increase in effective load is opposed mainly by the leaves; and upward movement due to release of load or rebound of the spring is opposed more by the auxiliary spring members.

Having described a preferred form of my invention, I claim:

1. In a leaf spring, in combination, a plurality of curved superposed spring leaves, and auxiliary spring members interspersed between said spring leaves, said spring members having a normal configuration of less curvature than the spring leaves.

2. In a leaf spring, in combination, a plurality of curved superposed spring leaves, and auxiliary spring members interspersed between said spring leaves, said spring members having a normal configuration of less curvature than the spring leaves, said spring members being of lesser resilient strength than said spring leaves.

3. In a leaf spring, in combination, a plurality of curved superposed spring leaves, and auxiliary spring members interspersed between said spring leaves, said spring members having a normal configuration of less curvature than the spring leaves, said spring members being of lesser resilient strength than said spring leaves and extending throughout the central portions of the spring leaves.

4. In a leaf spring, in combination, a plurality of curved superposed spring leaves, auxiliary spring members interspersed between said spring leaves, said spring members having a normal configuration of less curvature than the spring leaves, said spring members being of lesser resilient strength than said spring leaves and extending throughout the central portions of the spring leaves, and rolling bearings between the outer portions of those spring leaves which are spaced apart by said auxiliary spring members.

5. In a leaf spring, in combination, a plurality of curved superposed spring leaves, auxiliary spring members interspersed between said spring leaves, said spring members having a normal configuration of less curvature than the spring leaves, said spring members being of lesser resilient strength than said spring leaves and extending throughout the central portions of the spring leaves, rolling bearings between the outer portions of those spring leaves which are spaced apart by said auxiliary spring members, and spacer frames for said rolling bearings pivotally connected to said auxiliary spring members and pivotally connected together.

6. In a leaf spring, in combination, a plurality of superposed spring leaves, auxiliary spring members interspersed between the central portions of said leaves, and tending to put an initial stress upon said leaves, and rolling bearings situated between the outer parts of said leaves whose inner parts are spaced apart by said auxiliary spring members.

7. In a leaf spring, in combination, a plurality of superposed curved spring leaves, auxiliary spring members interspersed between the central portions of said leaves and having a normal curvature less than that of the spring leaves, and rolling bearings between the outer portions of those spring leaves whose central parts are spaced apart by said auxiliary spring members.

8. In a leaf spring, in combination, a plurality of superposed spring leaves all of substantially the same unstressed shape, and an auxiliary spring member between two of the leaves, said auxiliary member being of such unstressed shape as to have a resilient action tending to normally distort the spring leaves in the same direction as that caused by the load carried by the spring.

9. In a leaf spring, in combination, a plurality of superposed spring leaves all of substantially the same unstressed shape, and an auxiliary spring member between two of the leaves, said auxiliary member being of substantially the same shape as the spring leaves are when under their normal load.

10. In a leaf spring, in combination, a plurality of curved superposed spring leaves, and auxiliary spring members interspersed between said spring leaves, said spring members having a normal unstressed configuration substantially the same as that of the spring leaves when under their normal load.

11. In a leaf spring, in combination, a plurality of superposed spring leaves, auxiliary spring members interspersed between the central portions of the leaves, and anti-friction members situated between the outer parts of the leaves whose inner parts are spaced apart by the auxiliary spring members.

In witness that I claim the foregoing I have hereunto subscribed my name this 1st day of December, 1916.

JOHN M. HAMILTON.

Witnesses:
 JAMES T. BARKELEW,
 ELWOOD H. BARKELEW.